United States Patent [19]

Baloh et al.

[11] Patent Number: 4,755,351

[45] Date of Patent: Jul. 5, 1988

[54] FUEL ASSEMBLY

[75] Inventors: Frank J. Baloh, Dawson; James A. Sparrow, Plum Boro, both of Pa.

[73] Assignee: Westinghouse Electric Corp., Pittsburgh, Pa.

[21] Appl. No.: 873,061

[22] Filed: Jun. 4, 1986

Related U.S. Application Data

[63] Continuation of Ser. No. 698,335, Feb. 5, 1985, abandoned.

[51] Int. Cl.⁴ .............................................. G21C 3/00
[52] U.S. Cl. ..................................... 376/362; 376/285
[58] Field of Search .............. 376/176, 178, 285, 302, 376/303, 362, 364, 365

[56] References Cited

U.S. PATENT DOCUMENTS 3,600,276 8/1971 Nims, Jr. ............................. 376/285
3,676,296 7/1972 Linning et al. .
3,853,703 12/1974 Anthony et al. ..................... 376/364
4,583,584 4/1986 Wepfer ............................... 376/285

Primary Examiner—Deborah L. Kyle
Assistant Examiner—Richard L. Klein

[57] ABSTRACT

The leaf springs mounted in the upper nozzle of a prior art fuel assembly, which are compressed by the upper core plate to restrain the upward movement of the fuel assembly under the pressure of upwardly-flowing coolant, as dispensed with. Instead the fuel assembly is permitted to rise in a controlled manner into engagement with the upper core-support plate. The lower nozzle is provided with snubbers which engage, and exert low pressure, as required by the specifications governing a reactor, on the lower core plates when the fuel assembly is raised into engagement with the upper core plate by the force of the flowing coolant. In addition springs are provided between the pins extending from the upper and lower core plates and the walls of the holes in the upper and lower nozzles to suppress vibration under the transverse forces impressed by the flowing coolant.

12 Claims, 2 Drawing Sheets

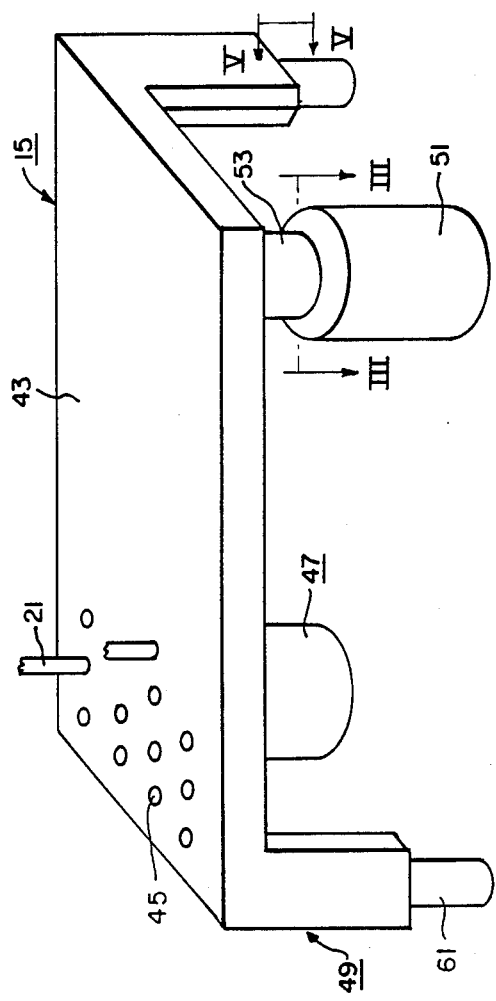
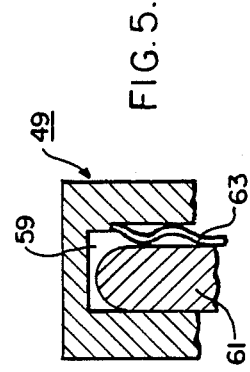
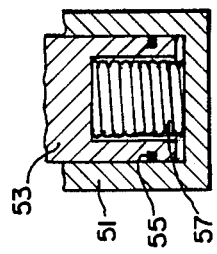
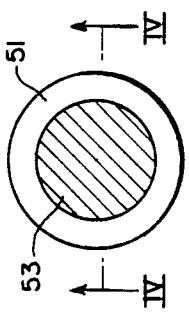

FUEL ASSEMBLY

REFERENCE TO RELATED APPLICATIONS

This application is a continuation of application Ser. No. 698,335, filed Feb. 5, 1985 now abandoned to Frank J. Baloh et al. for "FLUID ASSEMBLY" and assigned to Westinghouse Electric Corporation.

BACKGROUND OF THE INVENTION

This invention relates to nuclear reactors and has particular relationship to fuel assemblies. A fuel assembly includes a skeleton in which fuel rods are supported and into which control rods and the like penetrate. The skeleton includes an upper or top nozzle, a lower or bottom nozzle and a plurality of egg-crate-like grids spaced between the nozzles. The grids are composed of interlaced straps. The nozzles and straps are held together by thimble tubes (some of which receive the control rods) which extend between the nozzles and to which the grids are secured. Each fuel rod is held in a column of aligned pockets in the grids between oppositely-disposed springs and dimples. The springs are each mounted on a part of a strap bounding a pocket and urge the rods into firm engagement with the dimples in the part of the opposite strap bounding the jacket. The fuel assemblies are mounted between the upper and lower core-support plates of the reactor.

This invention is described in this application as integrated into a nuclear reactor of the pressurized water type (PWR) to which it is uniquely applicable. It is to be understood that embodiment of this invention into reactors of other types is within the scope of equivalents of this invention.

During normal operation of a PWR, the flow of coolant, which may be as high as 50 feet per second, through each fuel assembly produces a net upward force of substantial magnitude on the assembly that would cause vertical movement, i.e., would cause the assembly to rise, if the assembly were not restrained. In accordance with the teachings of the prior art, that restraint is provided by a plurality of heavy leaf springs mounted on the top nozzle. These springs are compressed by the upper core plate and produce a restraining force that is larger than the assembly lift forces by a specified magnitude. The force which the springs counteract may be as high as 1500 to 2000 pounds. The compressive load supplied by the springs varies over the assembly lifetime because of thermal and irradiation-induced differential growth of the assembly relative to the upper core plate and spring irradiation-induced relaxation.

The leaf springs are costly and complicate the structure and use of the top nozzle and of the fuel assembly as a whole. They constitute an appreciable increase, formidable in its demands, of the number of parts which must be assembled to construct a fuel assembly and maintained during its life. Because the springs are mounted on the corners of the upper nozzle but engage the core plate a distance from the corners, the upper nozzle must have substantial depth so that it can withstand the high bending loads exerted by the springs. The length of the fuel rods which can be accommodated by the prior-art assembly is correspondingly reduced. The leaf springs exert a reactive upward load on the upper core plate and on the upper internals of the reactor even when the coolant is not flowing as, for example, after refueling when the vessel head has been reinstalled. This upward load exacerbates the difficulty of tensioning the bolts which secure the head to the body of the reactor pressure vessel following refueling or initially. The resilience and dimensions of the leaf springs are materially affected by the thermal conditions in the reactor and by neutron irradiation. The downward load on the lower core-support plate, which is impressed solely by the leaf springs, thus varies in normal operation as the temperature within the reactor varies and also changes progressively, during the life of the reactor as a result of neutron irradiation.

It is an object of this invention to overcome the above-described disadvantages and drawbacks of the prior art and to dispense with the heavy holddown springs in the fuel assemblies of a nuclear reactor. It is an object of this invention to provide a nuclear fuel assembly for a nuclear reactor which shall not include the heavy holddown springs of prior-art assemblies.

SUMMARY OF THE INVENTION

In accordance with this invention a fuel assembly is provided which, instead of being held down by heavy leaf springs, while the coolant is flowing through the reactor, is permitted to move; i.e., float, in a controlled manner so that the upper nozzle is in engagement with the upper core-support plate of the reactor. Typically, the maximum clearance required to accommodate axial assembly growth, both thermal and resulting from irradiation is about 1½ inches (Anthony—U.S. Pat. No. 4,078,967, in column 4, lines 20-24, puts the growth between the cold beginning of life of a fuel assembly and its hot end of life, including variations between assemblies resulting from tolerances, at 1¾ inches in a 170 inch-long assembly). The length of the fuel assembly must then be 1½ inches (or 1¾ inches in Anthony's example) shorter than the distance between the inward surfaces of the core plates since the maximum movement which can occur under the force of the coolant is then 1½ inches (or 1¾ inches in Anthony's example). Lateral motion of the fuel assembly is restrained, at all times, by alignment pins. The pins typically extend from the upper and lower core plates and engage in holes generally coaxially in the top and bottom nozzles. This structure may be reversed so that the pins extend from the top and/or bottom nozzles and engage in holes in the upper and/or lower core plates. The pins and the cooperative holes should be of such length as to accommodate the full movement of the assembly. In accordance with an aspect of this invention the pin-hole units are provided with means for assuring that the pins, which are slidable in the holes, fit snugly, so that vibration under the action of the flowing coolant is precluded. Unless suppressed, movement of the fuel assembly would occur because of pin-hole tolerance and cross-flow induced motion at the inlet of the lower nozzle. The springs on the top nozzle are thus dispensed with. Load pads are provided to interface with the upper core plate and to provide clearance above the nozzle to accommodate inserts in the thimbles such as control assemblies, burnable neutron absorbers, etc.

In accordance with a further aspect of this invention, the minimum downward loading on the lower core plate demanded by the specifications is provided. For this purpose at least one snubber is interposed between the bottom nozzle and the lower core plate. The snubber essentially includes a spring-loaded hydraulic piston with seal rings which is connected to the lower nozzle. The piston is slidable in a cylinder under force exerted on the nozzle. Between the piston and the cylinder there is a compression spring. The spring exerts just enough force to urge the cylinder into engagement with the lower core plate with the force demanded by the design specifications when the fuel assembly is driven upwardly by the hydraulic force of the upwardly-flowing coolant so that the top nozzle is in engagement with the upper core plate under pressure. The spring is dimensioned to apply the required minimum down load to the lower core plate. Typically the spring may exert a force of about 50 to 100 pounds. Because the coolant is under high pressure (2000 pounds per square inch), coolant penetrates into the cylinder. The movement of the piston of the snubber is damped by the coolant in the cylinder.

If the lift forces on the assembly are removed (loss of coolant), leakage of fluid from the snubbers controls the rate at which the assemblies can drop. Leakage can be highly restricted to assure long drop times or small holes can be drilled in the seal ring to accurately control the discharge rate for faster drops. The limited maximum vertical motion assures that structural grids on adjacent assemblies do not have elevation mismatches which could cause interference at grid corners. This is most important near the assembly vertical center. The alignment pins prevent such interference near the top and bottom of the assembly. Because, in the practice of this invention, the fuel assembly moves while in the core, the effect of inadvertent movement must be considered. The anticipated initial upward movement of the assemblies occurs at zero power with all control rods inserted. Therefore, concerns for reactivity/power effects are not pertinent. Even if some assemblies did not move upwardly when anticipated but did so later while at power, the effect would be to reduce reactivity because the fuel would be nearer to the parked control rods since the assemblies would move upwardly and encompass greater lengths of control rods. The reverse movement, i.e., lowering of the assemblies when flow is reduced, also does not produce any operational problems. The maximum reactivity insertion due to all assemblies dropping is small (less than 20 pcm or 2% power). The snubbers assure that even for this worst case, insertion is very slow and well within the response capability of the protection system. Normally downward movement occurs when the pumps are shut down after the reactor is subcritical. In the practice of this invention the upward force on the upper core plates may actually be reduced. In accordance with prior-art practice, the holddown springs are dimensioned to provide downward force which is greater than the maximum practicable upward force. In accordance with the invention, the loading on the upper core plate cannot exceed the hydraulic lift forces on the assembly plus the reaction force of the snubber springs. Requirements for holddown of the lower internals can be met by selecting the spring constant of the snubber springs to provide adequate downward loading per assembly.

This invention has the following advantages:

1. The structure of the top nozzle is simplified by elimination of the leaf springs and their securing mechanisms. The depth of the top nozzle is reduced because it need not be constructed to withstand the considerable pressure of the leaf springs developed by coolant flowing typically at a velocity of 50 feet per second.

2. Because the depth of the top nozzle is reduced, the length of the fuel rods may be correspondingly increased without increasing the length of the fuel assembly. This increase in length could potentially be as much as 2 inches. The linear heating rates and power peaking factors are correspondingly reduced.

3. Because the leaf springs are dispensed with, the upward load on the upper internals is removed when the coolant flow is interrupted, as during refueling. The bolts which secure the head to the body of the pressure vessel are more readily tensioned.

4. A constant preset downward load, as required by design specifications, is applied to the lower core plate.

5. Since the snubber springs are dimensioned to provide substantially lower forces than the leaf springs, (50 to 100 pounds compared to 500 pounds) their sensitivity to radiation is far less critical.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 2 is a fragmental view in isometric enlarged showing the lower nozzle and its related parts;

FIG. 3 is a view in transverse section taken along line III—III of FIG. 2;

FIG. 4 is a view in transverse section taken along line IV—IV of FIG. 3; and

FIG. 5 is a fragmental view in longitudinal section taken along line V—V of FIG. 2.

DETAILED DESCRIPTION OF EMBODIMENT

Figure 1:
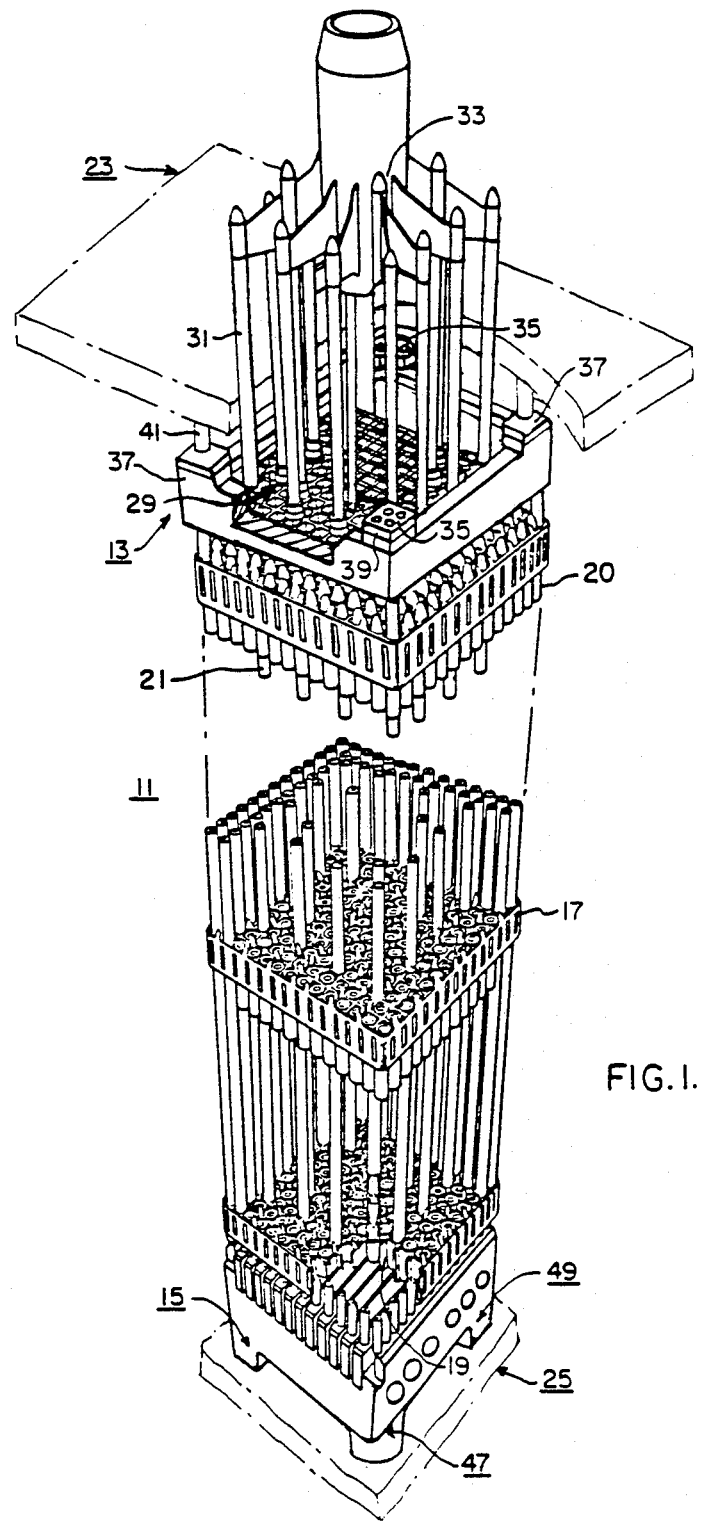
FIG. 1 is a view in isometric of a nuclear fuel assembly in accordance with this invention and also showing the relationship of the assembly to the upper and lower core-support plates.

The apparatus shown in the drawings is part of a nuclear reactor including a nuclear fuel assembly 11. The assembly 11 includes a skeleton formed of an upper nozzle 13, a lower nozzle 15 and a plurality of spaced screens 17 formed of straps interlaced in the manner of an egg crate to define aligned pocket 19. The nozzles 13 and 15 and the screens 17 are formed into a rigid body by thimble tubes 20 which extend around their peripheries and are joined to the screens. Fuel rods 21 are held in aligned pockets by springs (not shown) mounted on the part of the strap (not shown) bounding each pocket and dimples (not shown) in the part of each opposite strap bounding the pocket (see Andrews No. Re. 30047).

The fuel assembly 11 is interposed between an upper core-support plate 23 and a lower core-support plate 25. These core plates 23 and 25 are connected to the core barrel (not shown) of the reactor.

The upper nozzle 13 is in the shape of a plate of generally rectangular transverse cross-sections having a bottom which has holes 29 for transmitting the coolant and also holes (not shown) through which control rods 31, suspended from a spider 33, penetrate. The upper nozzle 13 also has, diagonally disposed, upwardly extending feet 35 and 37. The feet 35 are provided with load pads 39. The feet 37 are provided with axial holes. The upper core plate 23 has alignment pins 41 which extend generally axially with the holes. The pins 41 are of sufficient length to accommodate the full anticipated upward and downward movement of the fuel assembly 11.

The plate which constitutes the upper nozzle is thin and the feet 35 and 37 are short compared to the corresponding components of the prior-art nozzle (because the springs are eliminated). For this reason the fuel rods can be extended and are longer than the fuel rods in prior-art assemblies.

The lower nozzle 15 (FIG. 2) has a top 43 of generally rectangular transverse cross section having holes 45 for transmitting the coolant. Diagonally opposite feet 47 and 49 extend downwardly from the top 43. Each foot 47 is a snubber including a cup-shaped cylinder 51 (FIGS. 3, 4) within which an inverted cup-shaped piston 53 is slidable. A sealing ring (O-ring) 55 is embedded in the outer sliding surface of the piston 53. A helical compression spring 57 is connected to the piston 53 and cylinder 51 in such manner that it exerts downward pressure on the cylinder 51. Each leg 49 has a cylindrical hole 59 (FIG. 5) into which an alignment pin 62 projecting from the lower core-support plate 17 extends generally coaxially. A retaining spring 63 is interposed between the inner surface of the hole 59 and the pin 61. The spring assures that while the pin 61 is slidable relative to the hole, the pin engages the hole snugly so that vibrations of the fuel assembly 11 from which the leg 49 depends, under transverse forces of the coolant, are suppressed. A like retaining spring (not shown) is interposed between each pin 41 of the upper core support and the hole in leg 37 of the upper nozzle 13.

In the use of the fuel assembly 11 in a reactor, the fuel assembly is in the state shown in FIG. 1 in the quiescent conditioning of the reactor with the coolant pumps (not shown) not in operation. In this state the piston 53 is advanced into the cylinder 51 by the weight of the assembly. Since the pressure of the coolant is high, coolant has penetrated into the cylinder under the piston notwithstanding the sealing ring 55. The upper nozzle 13 in this state of the reactor is spaced from the upper core plate but the pins are inserted in the holes in leg 37 and the pins 61 in the holes 59. When the coolant pumps are turned on, the coolant flows upwardly through the lower core plate 25, the lower nozzle 15, the interior of the assembly 11, the upper nozzle 13 and the upper core plate 23. The fuel assembly 11 is raised by the force of the coolant and the loads pads 39 engage the lower surface of the core plate 23 under pressure. The reactive force on the spring 57 causes the cylinders 51 to move downwardly so that the snubbers 47 assume the state shown in FIG. 2. The spring 57 causes the cylinder 51 to engage the upper surface of the bottom core plate 25. The spring 57 is dimensioned so that the pressure exerted by the cylinder on the core plate 25 is the required pressure. The retaining springs 63 suppress vibration of the fuel assembly.

While a preferred embodiment of this invention has been disclosed herein, many modifications thereof are feasible. This invention is not to be restricted except insofar as is necessitated by the spirit of the prior art.

We claim:

1. In a nuclear reactor a nuclear fuel assembly, said nuclear reactor having upper and lower core-support plates, each said plate having alignment means for said fuel assembly, said reactor to conduct a coolant under high pressure and at a high velocity in the direction from said lower core-support plate to said upper core-support plate; said fuel assembly having an upper nozzle, a lower nozzle, means, connected to said nozzles, for supporting fuel rods between said nozzles, means, in said nozzles, cooperative with said alignment means, for aligning said fuel assembly moveable between said lower and upper core-support plates between a first position in which said upper nozzle is retracted from said upper core-support plate and a second position in which said upper nozzle is in engagement with said upper core-support plate, and at least one snubber interposed between said lower nozzle and said lower core-support plate, said snubber including a cylinder, a piston slidable in said cylinder and a spring connected to said piston and cylinder for exerting force between said piston and cylinder, said piston being connected to said lower nozzle, said spring having a force which is substantially smaller than the weight of said assembly allowing movement of said assembly under the force of coolant flow from said first position in the quiescent state of said coolant toward said second position in the flowing state of said coolant, said spring being set so that it exerts force on said cylinder in the direction away from said lower nozzle and towards said lower core-support plate, said spring being dimensioned so that when upward force is exerted on said fuel assembly by said coolant, causing said upper nozzle to engage said upper core-support plates, said spring exerts just sufficient downward force on said cylinder to cause said cylinder to engage said lower core plate with the relatively low force demanded by design specification requirements.

2. In a nuclear reactor a nuclear fuel assembly, said nuclear reactor having upper and lower core-support plates, each said plate having alignment means for said fuel assembly, a coolant under high pressure to be transmitted at a high velocity in said reactor through said fuel assembly in the direction from said lower core-support plate to said upper core-support plate; said fuel assembly having an upper nozzle, a lower nozzle, means, on said nozzles, cooperative with said alignment means, for aligning said fuel assembly moveable between said lower and upper core-support plates between a first position in which said upper nozzle is retracted from said upper core-support plate and a second position in which said upper nozzle is in engagement with said upper core-support plate, and at least one snubber interposed between said lower nozzle and said lower core-support plate, said snubber including a floating cylinder, a piston slidable in said cylinder, and a spring connected to said piston and cylinder for exerting force between said piston and cylinder, said piston being connected to said lower nozzle, and said spring being so set as to urge said cylinder in a direction from said lower nozzle towards said lower core-support plate, said spring having a force which is substantially smaller than the weight of said assembly so as to allow movement of said assembly under the force of said up-flowing coolant, between said first position in the quiescent state of said coolant and a second position in the flowing state of said coolant, whereby when said fuel assembly is raised under the force of the up-flowing coolant, downward force exerted by said spring on said cylinder, said downward force being just sufficient to impress the relatively low force required on the lower core-support plate and to anchor said fuel assembly between said upper core-support plate and said lower core-support plate.

3. The nuclear fuel assembly of claim 2 wherein the aligning means include resilient means for suppressing vibration of the fuel assembly under the forces exerted by the flowing coolant.

4. In a nuclear reactor a nuclear fuel assembly, said nuclear reactor having upper and lower core-support plates, each said plate having alignment means for fuel assemblies, a coolant under high pressure to be transmitted at a high velocity in said reactor through said fuel assembly in the direction from said lower core-support plate towards said upper core-support plate; said fuel assembly having an upper nozzle, a lower nozzle, means, on said nozzles, cooperative with said alignment means, for aligning said fuel assembly moveable between said upper and lower core-support plates between a first position in which said upper nozzle is retracted from said upper core-support plate and a second position in which said upper nozzle is in engagement with said upper core-support plate and at least one snubber interposed between said lower nozzle and said lower core-support plate, said snubber including a floating cylinder, a piston, slidable in said cylinder, and a spring connected to said piston and cylinder for exerting force between said piston and cylinder, said piston being connected to said lower nozzle and said spring exerting a force in a direction from said lower nozzle toward said lower core-support plate urging said cylinder towards engagement with said lower core-support plate, the force of said spring being substantially smaller than the weight of said assembly allowing said assembly to be in said first position in the quiescent state of said coolant and to move from said first position towards said second position under the force of said flowing coolant.

5. In a nuclear reactor having upper and lower core-support plates, a fuel assembly having an upper nozzle and a lower nozzle interposed between said core-support plates, a coolant under high pressure to be transmitted at high velocity in said reactor through said fuel assembly in the direction from said lower core-support plate to said upper core-support plate; each said core-support plate having at least one pin extending towards said fuel assembly and each nozzle having at least one hole, said pins to extend respectively into said holes in said upper and lower nozzles for aligning said fuel assembly when said fuel assembly is positioned in said reactor, and resilient means interposed in at least one of said holes between said inner boundary of said one hole and said pin to suppress vibration of said fuel assembly under the forces exerted by said flowing coolant; and at least one snubber interposed between said lower nozzle and said lower core-support plate, said snubber including a floating cylinder, a piston slidable in said cylinder, and a spring, having a force less than the weight of said fuel assembly, connected to said piston and cylinder, said piston being connected to said lower nozzle and urging said cylinder in the direction from said lower nozzle towards said lower core-support plate, said spring when said fuel assembly is raised under the force of said up-flowing coolant, exerting a reactive downward force on said cylinder just sufficient to impress the relatively low force required on the lower core-support plate and to anchor said fuel assembly between said upper core-support plate and said lower core-support plate.

6. A fuel assembly a nuclear reactor said nuclear reactor having upper and lower core-support plates, each said plate having alignment means for fuel assemblies, said reactor also having means for transmitting a coolant under high pressure and at a high velocity through said fuel assembly in the direction from said lower core-support plate toward said upper core-support plate; said fuel assembly having an upper nozzle, a lower nozzle, means on said nozzle, cooperative with said alignment means, for aligning said fuel assembly moveable between said upper and lower core-support plates between a first position in which said upper nozzle is retracted from said upper core-support plate and a second position in which said upper nozzle is in engagement with said upper core-support plate, and at least one snubber interposed between said lower nozzle and said lower core-support plate, said snubber including a floating cylinder, a piston slidable in said cylinder, and a spring connected to said piston and cylinder for exerting force between said piston and said cylinder, said piston being connected to said lower nozzle and said spring exerting a force in a direction from said lower nozzle towards said lower core-support plate urging said cylinder towards engagement with said lower core-support plate, the force of said spring being between 50 pounds and 100 pounds, which force is substantially smaller than the weight of said assembly allowing said assembly to be in said first position in the quiescent state of said coolant and to move under the force of said flowing coolant towards said second position, said coolant penetrating under its high pressure between said piston and cylinder damping the movement of said cylinder when said cylinder is urged towards or away from engagement with said lower core-support plate.

7. The method of operating a nuclear reactor having upper and lower core-support plates and having a fuel assembly, each said upper and lower core-support plates having alignment means for said fuel assembly, said reactor also having means for transmitting a coolant under high pressure in a direction from said lower to said upper core-support plate, said fuel assembly having an upper nozzle and a lower nozzle and means on said upper and lower nozzles, cooperative with said alignment means, for aligning said fuel assembly freely movable between said upper and lower core-support plates and a spring interposed between said lower nozzle and said lower core-support plate, the said method comprising: selecting said spring to exert a force substantially less than the weight of said assembly so that in the absence of flow of coolant through said reactor said fuel assembly is positioned, under the excess of the force exerted by the weight of said assembly over the force exerted by said spring, with said upper nozzle disengaged from said upper core-support plate and said lower nozzle near said lower core-support plate, transmitting coolant through said reactor, and under the force of said coolant actuating said fuel assembly to move freely upwardly under the restraint of the aligning means and the spring, so that said upper nozzle is moved into engagement with said upper core-support plate and said lower nozzle is retracted further from said lower core-support plate.

8. The method of operating a nuclear reactor having pump means for transmitting a coolant and also having upper and lower core-support plates and a fuel assembly having an upper nozzle and a lower nozzle, said nozzles and upper and lower core-support plates having mutually cooperative means for aligning said fuel assembly movably between said upper and lower core-support plates, and at least one snubber interposed between said lower nozzle and said lower core-support plate, said snubber including a floating cylinder, a piston connected to said lower nozzle, and a spring connected to said piston and cylinder for exerting force between said piston and cylinder, said spring, having a force selected to be substantially less than the weight of said assembly and urging said cylinder in a direction away from said lower nozzle and towards said lower core-support plate; the said method comprising at the start of operation of said reactor from a state in which the pump means is not in operation, and the upper nozzle is retracted from said upper core-support plate, and said lower nozzle is near said lower core-support plate, enabling the pump means to transmit coolant at high pressure and at high velocity through said reactor in a direction from said lower core-support plate to said upper core-support plate, thus causing said assembly to move, on said alignment means, under the force of said fluid so that said upper nozzle engages said upper core-support plate and also thus causing said lower nozzle to be retracted from said lower core-support plate, when said lower nozzle is so retracted from said lower core-support plate causing said cylinder to move under the action of said spring into engagement with, and to exert the force of said spring on, said lower core-support plate, and causing said coolant under its high pressure to penetrate into said cylinder between said piston and cylinder to damp the said movement of said cylinder.

9. The method of operating a fuel assembly in a nuclear reactor, said reactor having pump means for transmitting a coolant and also having upper and lower core-support plates and said assembly having an upper nozzle, a lower nozzle and means, cooperative with said nozzles and said core-support plates, for aligning said fuel assembly movable, on said aligning means, between said core-support plates, and said assembly also having at least one snubber interposed between said lower nozzle and said lower core-support plate, said snubber including a cylinder, a piston slidable in said cylinder and a spring connected to said piston and cylinder for exerting force between said piston and cylinder urging said cylinder in the direction away from said lower nozzle and toward said lower core-support plate, said force being selected to be substantially lower than the weight of said fuel assembly; the said method comprising: at the start of operation of said reactor from a state in which the pump means is not in operation and said upper nozzle is retracted from said upper core-support plate and said lower nozzle is near said lower core-support plate, enabling the pump means to transmit coolant under high pressure and at a high velocity through said reactor in a direction from said lower core-support plate to said upper core-support plate, thus causing said assembly to move upwardly so that its upper nozzle engages said upper core-support plate under the force of said coolant and said lower nozzle is retracted from said lower core-support plate, when said lower nozzle is retracted from said lower core-support plate exerting the force of said spring on said lower core-support plate by causing said cylinder to move into engagement with said lower core-support plate under the force of said spring, and causing the coolant under its high pressure to penetrate into said cylinder between said piston and said cylinder to damp the movement of said cylinder.

10. The method of operating a nuclear reactor having upper and lower core-support plates and a fuel assembly having an upper nozzle and a lower nozzle, said nozzles and upper and lower core-support plates having mutually cooperative means for aligning said fuel assembly movably between said upper and lower core-support plates, between a first position in which said upper nozzle is retracted from said upper core-support plate and a second position in which said upper nozzle is in engagement with said upper core-support plate, and spring means interposed between said lower nozzle and said lower core-support plate, said spring means having a spring force substantially smaller than the weight of said fuel assembly; the said method comprising: maintaining said fuel assembly in said first position under the weight of said fuel assembly overriding said spring means in the absence of coolant in said reactor or in the quiescent state of coolant in said reactor, transmitting coolant at high pressure and at high velocity through said reactor in a direction from said lower core-support plate to said upper core-support plate, thus causing said assembly to move on said aligment means under the force of said fluid towards said second position and retracting said lower nozzle and said spring means from said lower core-support plate, thereby causing said cylinder to move into engagement with, and to exert the force of said spring means on, said lower core-support plate, and damping the said movement of said cylinder by causing said coolant under its high pressure to penetrate into said cylinder between said piston and spring means.

11. The method of operating a nuclear reactor having pump means for transmitting a coolant and also having upper and lower core-support plates and a fuel assembly having an upper nozzle and a lower nozzle, said nozzles and upper and lower core-support plates having mutually cooperative means for aligning said fuel assembly movably between said upper and lower core-support plates; the said method comprising at the start of operation of said reactor from a state in which the pump means is not in operation and said upper nozzle is retracted from said upper core-support plate and said lower nozzle is near said lower core-support plate, enabling the pump means to transmit coolant at high pressure and at high velocity through said reactor in a direction from said lower core-support plate to said upper core-support plate, thus causing said assembly to move on said alignment means under the force of said coolant so that said upper nozzle engages said upper core-support plate and said lower nozzle is retracted from said lower core-support plate, responsive to the said retraction of said lower nozzle from said lower core-support plate resiliently applying force with a spring whose force is selected to be substantially less than the weight of said assembly on said lower core-support plate, and by the action of the high pressure of said coolant damping the application of said force on said lower core-support plate.

12. The method of operating a fuel assembly in a nuclear reactor, having pump means for transmitting a coolant and also having upper and lower core-support plates and said assembly having an upper nozzle, a lower nozzle and means, cooperative with said nozzles and said core-support plates, for aligning said fuel assembly movable between said core-support plates; the said method comprising: at the start of operation of said reactor from a state in which the pump means is not in operation and said upper nozzle is retracted from said upper core-support plate and said lower nozzle is near said lower core-support plate, enabling the pump means to transmit coolant under high pressure and at a high velocity through said reactor in a direction from said lower core-support plate to said upper core-support plate, said coolant thus causing said assembly to move, upwardly on said aligning means so that its upper nozzle engages said upper core-support plate under the force of said coolant and said lower nozzle is retracted from said lower core-support plate, responsive to said retraction of said lower nozzle from said lower core-support plate resiliently applying a force with a spring whose force is selected to be substantially less than the weight of said assembly on said lower core-support plate, and by the action of the high pressure of said coolant damping the applications of said force on said lower core-support plate.

* * * * *